A. BENAC.
Forges for Blacksmiths.
No. 166,247. Patented Aug. 3, 1875.
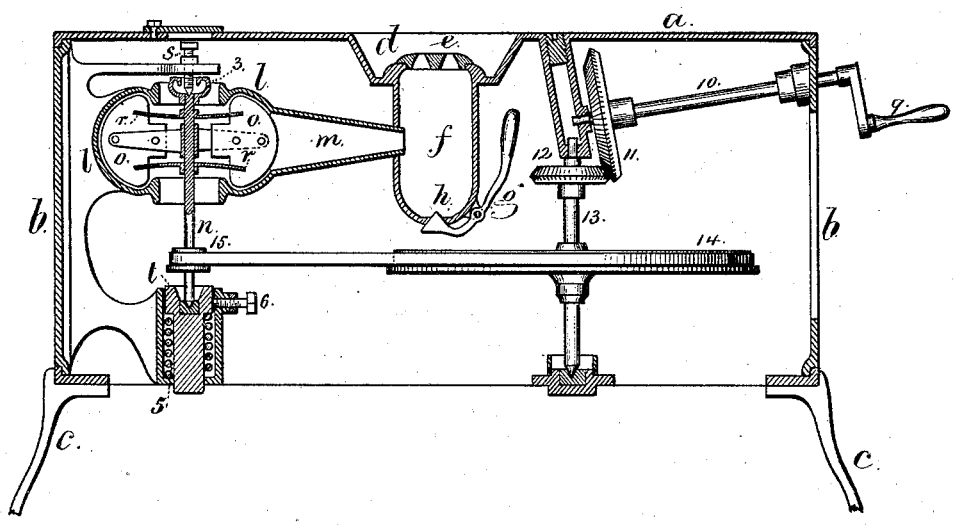
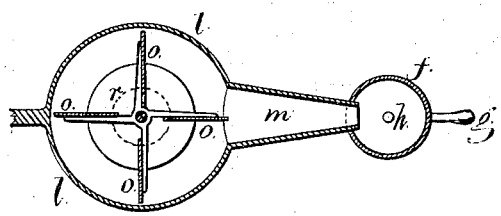
Witnesses
Chas H Smith
Geo. T Pinckney
Inventor
Auguste Benac.
per Lemuel W. Serrell
Atty

UNITED STATES PATENT OFFICE.

AUGUSTE BENAC, OF NEW YORK, N. Y., ASSIGNOR TO HIMSELF, LOUISE POULIN, AND EUGENE VON NORDHAUSEN, OF SAME PLACE.

IMPROVEMENT IN FORGES FOR BLACKSMITHS.

Specification forming part of Letters Patent No. 166,247, dated August 3, 1875; application filed May 14, 1875.

*To all whom it may concern:*

Be it known that I, AUGUSTE BENAC, of the city and State of New York, have invented an Improvement in Forges for Blacksmiths and others, of which the following is a specification:

This improvement relates to a revolving blower of peculiar construction, driven by a crank-handle and shaft, and arranged with reference to the tuyere-iron and hearth in such a manner that the rotary blower can be conveniently operated by the smith while attending to the article in the fire, and the whole forge is portable and easily cleaned and kept in working condition.

In the drawing, Figure 1 is a vertical section of the said forge; and Fig. 2 is a plan, partially in section, showing the blower and tuyere.

The forge-box is made with a top plate, $a$, and sides $b$, supported by the legs $c$, and in the top plate $a$ is a recess, $d$, for the fire, and an opening for the tuyere $e$. The wind-chamber $f$ is below the tuyere $e$, and it is provided with the lever $g$ and valve $h$, that can be operated by hand to allow the escape of ashes or dust from the wind-chamber. The blower is made of the circular case $l$, from which the nozzle $m$ passes to the wind-chamber $f$, and this blower has a central shaft, $n$, with fans $o$, within the circular case $l$, and revolving with the shaft $n$. The disks $r\ r$ surround the shaft $n$, and are of larger diameter than the central openings of the blower-case; but there are spaces between the said disks and the inner lips of such case, at the openings, sufficient to allow the atmospheric air to pass into the case and supply the blower, the revolving fans pressing the air by the centrifugal action out through the nozzle $m$ into the wind-chamber $f$, where it expands, equalizes, and rises through the tuyere into the fire. The shaft $n$ is supported at the ends in bearings $s$ and $t$, the upper one being a pointed screw, entering an oil-cup, 3, at the upper end of the shaft, and the lower bearing $t$ being a block with an oil-cup upon the upper end, forming a step for the shaft, and a spring, 5, serves to raise this step to compensate wear when the clamping-screw 6 is loosened. A crank-handle, 9, upon the outer end of the shaft 10, is used to give motion to the bevel-gears 11 and 12, shaft 13, and wheel 14, from which a belt passes to the pinion 15 upon the shaft $n$ of the blower, so as to give the required motion to the same.

This forge is compact, easily constructed and kept in repair, and the blacksmith is able to turn the handle and blow the bellows with great facility and uniformity; and, furthermore, there is no risk of the bellows becoming injured by dust or heat, and the crank movement requires less exertion than the ordinary lever for the bellows.

I claim as my invention—

The rotary blower consisting of the case $l$, vertical shaft $n$, oil-cup 3, screw $s$, adjustable bearing-block $t$, fans $o$, and disks $r$, of larger diameter than the openings in the case $l$, in combination with the wind-chamber $f$, tuyere $e$, handle 9, shaft 10, and gearing connecting to the blower, as set forth.

Signed by me this 12th day of May, A. D. 1875.

A. BENAC.

Witnesses:
   GEO. T. PINCKNEY,
   CHAS. H. SMITH.